US009870344B2

(12) United States Patent
Filev et al.

(10) Patent No.: US 9,870,344 B2
(45) Date of Patent: Jan. 16, 2018

(54) REASSIGNING ORDINAL POSITIONS OF CONTENT ITEM SLOTS ACCORDING TO VIEWPORT INFORMATION DURING RESOURCE NAVIGATION

(71) Applicant: Google Inc., Mountain View, CA (US)

(72) Inventors: Momchil Filev, Mountain View, CA (US); Martin B. Freund, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1132 days.

(21) Appl. No.: 13/633,324

(22) Filed: Oct. 2, 2012

(65) Prior Publication Data

US 2014/0095514 A1    Apr. 3, 2014

(51) Int. Cl.
*G06F 17/21* (2006.01)
*G06Q 30/02* (2012.01)
*G06F 17/30* (2006.01)

(52) U.S. Cl.
CPC ...... *G06F 17/212* (2013.01); *G06F 17/30867* (2013.01); *G06Q 30/0241* (2013.01); *G06Q 30/0277* (2013.01)

(58) Field of Classification Search
CPC .............. G06F 17/212; G06Q 30/0241; G06Q 30/0277
USPC ...................... 715/243, 253; 705/14.4, 14.73
See application file for complete search history.

(56) References Cited

U.S. PATENT DOCUMENTS

| 4,674,041 | A | * | 6/1987 | Lemon | G06Q 20/387 235/381 |
| 6,907,566 | B1 | * | 6/2005 | McElfresh | G06Q 30/02 705/14.43 |
| 6,934,743 | B2 | * | 8/2005 | Huat | G06Q 10/107 707/999.01 |
| 7,373,599 | B2 | * | 5/2008 | McElfresh | G06Q 30/02 715/210 |
| 7,576,754 | B1 | * | 8/2009 | Joseph | G01C 21/32 345/619 |
| 7,595,725 | B1 | * | 9/2009 | Joseph | G06Q 30/02 340/539.2 |
| 7,983,949 | B1 | * | 7/2011 | Joseph | G06Q 30/02 382/109 |
| 8,135,616 | B2 | | 3/2012 | Callaghan et al. | |

(Continued)

OTHER PUBLICATIONS

Notification of Transmittal of the International Search Report and the Written Opinion of the International Searching Authority, or the Declaration for PCT/US2012/060533 dated Apr. 25, 2013, 8 pages.

*Primary Examiner* — Mohammed-Ibrahim Zuberi
*Assistant Examiner* — Yahao Chen
(74) *Attorney, Agent, or Firm* — Fish & Richardson P.C.

(57) ABSTRACT

Methods, systems, and apparatus, including computer programs encoded on a computer storage medium, for adjusting ordinal positions for content item slots in response to determining that a content item slot with a highest slot ordinal position relative to the other content item slots in a resource is not within a viewport area. Adjusting the adjusting ordinal positions of either the content item slots or content items to be served in the content item slots ensures that a content item slot in the viewport displays a content item with a highest respective ordinal position in a ranking relative to other content items is rendered in the content item slot within the viewport area.

21 Claims, 5 Drawing Sheets

(56) References Cited

U.S. PATENT DOCUMENTS

| | | | |
|---|---|---|---|
| 8,229,915 B1* | 7/2012 | Lloyd | G06Q 30/0276 707/609 |
| 8,799,139 B1* | 8/2014 | Aggarwal | G06Q 30/08 705/14.4 |
| 8,949,370 B1* | 2/2015 | Wu | H04W 4/003 709/203 |
| 9,129,029 B1* | 9/2015 | Seth | G06F 17/30241 |
| 2002/0138331 A1* | 9/2002 | Hosea | G06F 17/30905 705/7.37 |
| 2004/0107439 A1* | 6/2004 | Hassell | H04N 5/44591 725/44 |
| 2004/0267806 A1* | 12/2004 | Lester | G06Q 30/02 |
| 2006/0031419 A1* | 2/2006 | Huat | G06Q 10/107 709/219 |
| 2006/0069808 A1* | 3/2006 | Mitchell | G06F 17/30905 709/246 |
| 2006/0107204 A1* | 5/2006 | Epstein | G06F 17/212 715/243 |
| 2006/0111970 A1* | 5/2006 | Hill | G06Q 30/02 705/14.52 |
| 2006/0224445 A1 | 10/2006 | Axe et al. | |
| 2007/0156621 A1* | 7/2007 | Wright | G06Q 30/02 706/48 |
| 2007/0260627 A1* | 11/2007 | Knittel | H04L 67/306 |
| 2008/0082400 A1* | 4/2008 | Martel | G06Q 30/02 705/14.42 |
| 2008/0086362 A1* | 4/2008 | Lee | G06Q 30/02 705/14.54 |
| 2008/0154888 A1* | 6/2008 | Buron | G06F 17/3087 |
| 2008/0183574 A1* | 7/2008 | Nash | G06F 17/30864 705/14.54 |
| 2008/0215966 A1* | 9/2008 | Suarez | G06F 17/30905 715/252 |
| 2008/0222530 A1 | 9/2008 | Lakshmanan et al. | |
| 2008/0262913 A1* | 10/2008 | Reitz | G06Q 30/0236 705/14.36 |
| 2008/0275757 A1* | 11/2008 | Sharma | G06Q 10/063 705/7.29 |
| 2008/0306794 A1* | 12/2008 | Cohen | G06Q 30/02 705/7.31 |
| 2009/0044145 A1 | 2/2009 | Seo | |
| 2009/0063377 A1* | 3/2009 | Brady | G06Q 30/0244 706/20 |
| 2009/0070190 A1* | 3/2009 | Gorty | G06Q 30/02 705/14.6 |
| 2009/0319333 A1* | 12/2009 | Dangaltchev | G06Q 30/0249 705/7.29 |
| 2009/0326966 A1* | 12/2009 | Callaghan | G06Q 30/02 705/1.1 |
| 2010/0005403 A1* | 1/2010 | Rozmaryn | G06Q 30/02 715/760 |
| 2010/0083163 A1* | 4/2010 | Maghoul | G06F 1/1626 715/781 |
| 2010/0114720 A1* | 5/2010 | Jones | G06Q 30/0251 705/14.73 |
| 2010/0131355 A1* | 5/2010 | Kitchen | G06Q 30/02 705/14.43 |
| 2010/0191727 A1* | 7/2010 | Malik | G06F 17/30867 704/734 |
| 2010/0198694 A1* | 8/2010 | Muthukrishnan | G06Q 30/0275 705/14.71 |
| 2010/0198697 A1* | 8/2010 | Brown | G06Q 30/02 705/14.73 |
| 2010/0235765 A1 | 9/2010 | Worthington | |
| 2010/0287134 A1* | 11/2010 | Hauser | G06Q 10/06375 706/54 |
| 2011/0029393 A1* | 2/2011 | Apprendi | G06Q 30/0277 705/14.73 |
| 2011/0035263 A1* | 2/2011 | Ramanathan | G06F 3/0485 705/14.4 |
| 2011/0047026 A1* | 2/2011 | Biggs | G06Q 30/02 705/14.46 |
| 2011/0055023 A1* | 3/2011 | McNeeley | G06Q 30/02 705/14.72 |
| 2011/0137733 A1* | 6/2011 | Baird | G06Q 30/0272 705/14.68 |
| 2011/0173534 A1* | 7/2011 | Huang | G06F 17/30702 715/702 |
| 2011/0191315 A1* | 8/2011 | Neumeyer | G06Q 30/0243 707/706 |
| 2011/0196735 A1* | 8/2011 | von Sydow | G06Q 30/02 705/14.43 |
| 2011/0264509 A1* | 10/2011 | McElfresh | G06Q 30/02 705/14.42 |
| 2011/0264510 A1* | 10/2011 | McElfresh | G06Q 30/02 705/14.42 |
| 2011/0276411 A1* | 11/2011 | McElfresh | G06Q 30/02 705/14.66 |
| 2012/0022926 A1* | 1/2012 | Ramanathan | G06F 3/0485 705/14.4 |
| 2012/0047033 A1* | 2/2012 | Hauser | G06Q 10/06375 705/14.73 |
| 2012/0089914 A1 | 4/2012 | Holt et al. | |
| 2012/0123874 A1* | 5/2012 | Park | G06Q 30/0273 705/14.69 |
| 2012/0143794 A1* | 6/2012 | Kanungo | G06F 17/30554 706/12 |
| 2012/0151406 A1 | 6/2012 | Oberstein | |
| 2012/0204094 A1* | 8/2012 | Liang | G06F 11/3495 715/234 |
| 2012/0259702 A1* | 10/2012 | Zhang | G06Q 30/0254 705/14.54 |
| 2012/0297324 A1* | 11/2012 | Dollar | G06F 3/0484 715/760 |
| 2013/0185164 A1* | 7/2013 | Pottjegort | G06Q 30/02 705/14.73 |
| 2013/0305170 A1* | 11/2013 | de Souza | G06F 3/0485 715/760 |
| 2013/0335427 A1* | 12/2013 | Cheung | G06T 13/00 345/473 |
| 2014/0040423 A1* | 2/2014 | Goh | G06Q 30/0241 709/217 |
| 2014/0074588 A1* | 3/2014 | Bertsch | G06Q 30/02 705/14.42 |
| 2014/0089107 A1* | 3/2014 | De Jager | G06Q 30/0277 705/14.73 |
| 2014/0229268 A1* | 8/2014 | Clapp | G06Q 30/0242 705/14.41 |
| 2015/0066658 A1* | 3/2015 | Chapin | G06F 17/30 705/14.71 |
| 2015/0242908 A1* | 8/2015 | Kobyakov | G06Q 30/0277 705/14.73 |
| 2015/0347431 A1* | 12/2015 | Kobyakov | G06Q 30/0241 715/202 |

* cited by examiner

REASSIGNING ORDINAL POSITIONS OF CONTENT ITEM SLOTS ACCORDING TO VIEWPORT INFORMATION DURING RESOURCE NAVIGATION

BACKGROUND

This specification relates to rendering content items at ordinal positions in resources.

The Internet enables access to a wide variety of resources, e.g., web pages for particular subjects, search results pages from search engines, news articles, etc. Such access to content has also lead to the providing of additional content items with the content. For example, online advertising involves the providing of advertising content items with resources served over the Internet.

Many resources include environments in which the content items are displayed with the resource. These environments are generally referred to as content item slots. The slots are defined by code that is included with the resource code, such as instructions, scripts, etc. that execute when a browser is rendering the resource. The slots are typically individually identified by corresponding slot identifiers, and are assigned slot ordinal positions. When the resource is rendered, the user device also executes instructions that cause the user device to request content items, such as advertisements, to display in the slots. A content item server selects content items for the slots in response to the request and sends the selected content items to the user device. The content items also are ordered according to a ranking, and each content item has a respective ordinal position in the ranking. The content items are then rendered in the slots according to corresponding ordinal positions of the content items in the ranking and the slots. For example, the content item with the highest respective ordinal position relative to respective ordinal positions of other content items is rendered in the content item slot with the highest slot ordinal position with respect to the slot ordinal positions of other content item slots, and so on.

The content item ordinal positions of content items that are served can be determined in a variety of appropriate ways. One of the most common ways is by an auction process. A content item sponsor, such as an advertiser, specifies bids for placement of content items in resources. The bids are input to an auction process that takes into account the bids and other factors, such as historical performance of the content items, how well the content items match the content item request, etc. The auction process generates an auction score for each participating content item based on these factors. The content items are then ranked according to their auction scores, and the top ranked content items are selected and served in response to the request. Typically one content item is selected for each content item slot, and the respective ordinal positions of the content items correspond to the respective positions of the content item slots.

The slot ordinal positions for a resource can also be determined in a variety of appropriate ways. For example, the slots may be ordered according to the sequence by which they are rendered, such as a top slot being first in the ordinal positions and a bottom slot being last. Alternatively, the slots may be ordered according to a sequence that is independent of the rendering order. The sequence may be, for example, coded into the resource, or, alternatively, determined by the content item server based on historical performance of slot positions.

Typically the slot ordinal positions are such that a top-ranked content item is displayed in the viewport when the resource is rendered.

SUMMARY

In general, one innovative aspect of the subject matter described in this specification can be embodied in methods that include the actions of processing a content item request for a resource, the content item request including viewport information specifying a viewport location and viewport area within a canvas for the resource, and wherein the resource includes a plurality of content item slots that each define a location in the resource at which a content item responsive to the request is to be rendered, and each content item slot has a slot ordinal position relative to other content item slots in the resource that corresponds to respective ordinal position of a content item in a ranking for content items served in response to the request; receiving data specifying respective ordinal positions for content items in a ranking of content items determined to be responsive to the request, the respective ordinal positions causing the content item with the highest respective ordinal position in the ranking to be rendered in the content item slot with a highest ordinal position relative to the other content item slots; determining, from the viewport information, that the content item slot with a highest slot ordinal position relative to the other content item slots is not within the viewport area and in response generating adjusted ordinal positions for the content item slots, wherein a content item slot in the viewport corresponds to a highest adjusted ordinal position relative to the other content item slots; and processing, in response to the content item request, position data defining the adjusted ordinal positions for the content item slots and the content items for presentation in the content item slots. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Ensuring highest-ranked content items are rendered in a viewport when the viewport is not in a default position of the canvas leads to higher publisher revenues. Furthermore, advertisers will benefit from an increased exposure of their highest ranked advertisements, as the highest ranked advertisements will not be rendered in portions of a resource that a user may not view. Additionally, rendering the highest ranked advertisements in the viewport when the viewport is not in the default location meets advertisers' expectations of advertisement placement, which, in turn, facilitates more accurate planning of advertising campaigns. Finally, the advertisements that are determined to be most relevant are within the viewport when the user device renders the resource, and thus users are more likely to be presented with information that satisfies their informational needs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
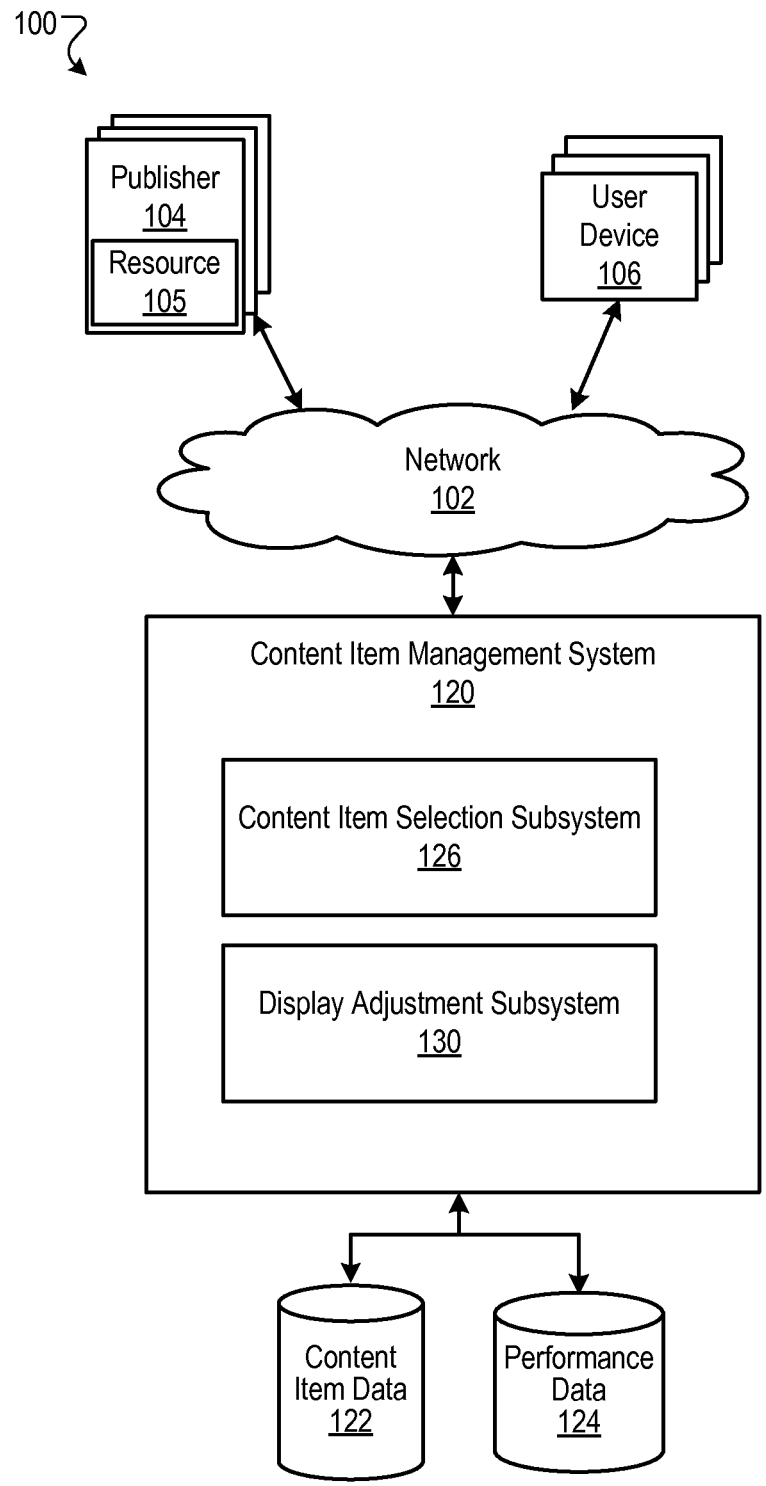
FIG. 1 is a block diagram of an environment in which content items are provided to user devices.

As used in this document, a viewport defines a viewing area through which a rendered resource is displayed. Often the viewport is smaller than the area of the rendered resource. The area in which the resource is rendered is referred to as the "canvas." The canvas can be infinite for each dimension; typically, however, rendering generally occurs within a finite region of the canvas, and the viewport may move within the finite region.

As described above, content items are rendered according to a respective ranking of the content items and corresponding ordinal positions of content item slots in a resource. While such ordering of content items works very well for an initial rendering of a resource when a user first visits the resource during a browsing session, the ordering does not take into account the position of the viewport on the resource canvas when a user revisits the resource by use of a navigation stack (such as by use of a "back" command to pop an address of a most recently-visited resource from a list of resources visited during a browsing session). When using a navigation stack, or some other input process based on historical data, many web browsers render the resource so that the viewport is positioned at the viewport's previous location on the resource canvas when the browser navigated to another resource.

Thus, when a user device goes back to the resource, the user is taken directly to the specific part of the resource that the user was viewing before last leaving the resource. Furthermore, the re-rendering of the resource may result in another content item request, and new content items may be served for the resource. However, if the viewport is not in the default location on the canvas (e.g., such as the upper left corner of the viewport not being located at a pixel location of [0,0]), the content item slot that displays the highest ranked content item may not be displayed in the viewport.

The systems and methods described in this specification adjust the rendering order of content items such that the highest ranked content item is served in a content item slot that is displayed in the viewport, even when the viewport is not in a default location. This ensures that users view the highest ranked content items when the users revisit the resources.

In some implementations, each content item request includes viewport information specifying a viewport location and viewport area within a canvas for the resource. When the viewport location is such that the highest raked content item (or items) will not be displayed in the viewport when the resource is rendered, adjusted ordinal positions for the content item slots are generated. The adjusted ordinal positions result in the content item slot in the viewport corresponding to a highest adjusted ordinal position relative to the other content item slots.

The adjusted ordinal positions can be generated by either adjusting the ordinal positions of the content item slots, or by adjusting the ordinal positions of the content items. In the case of the former, the ordinal positions the content item slots are adjusted so that the content item slot within the viewport corresponds to the first ordinal position. The content items are then rendered according to their own respective ordinal positions, which are not adjusted. In the case of the latter, the respective ordinal positions the content items are adjusted so that the content item slot within the viewport corresponds to the content item that is ranked first in the ranking. The content items are then rendered according to the adjusted ordinal positions in the corresponding ordinal positions of the content item slots, which are not adjusted. Either implementation may be realized at the content item server, or, alternatively, at the user device.

These features and additional features are described in more detail below.

FIG. 1 is a block diagram of an example environment 100 in which content items are provided to user devices. A computer network 102, such as a local area network (LAN), wide area network (WAN), the Internet, or a combination thereof, connects publisher web sites 104, user devices 106, and a content item management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

The content item management system 120 facilitates the provisioning of content items that are shown with the resources 105. One example content item management system is an advertisement management system that allows advertisers to define selection rules that take into account attributes of the particular user to provide targeted advertisements for the users. Example selection rules include keyword selection, in which advertiser provide bids for keywords that are present in either search queries (for search result pages) or webpage content (for web pages of particular subject matter).

Advertisements that are associated with keywords having bids that result in an advertisement slot being awarded in response to an auction are selected for displaying in the advertisement slots. When a user of a user device 106 selects an advertisement, the user device 106 generates a request for a landing page of the advertisement, which is typically a webpage of the advertiser. For example, the publishers 104 may include advertisers, each having hosting respective web pages, some of which are landing pages for the advertisements of the advertisers. A resource 105 from a publisher 104 includes instructions that cause the user device to request advertisements from the advertisement management system 120. The request includes a publisher identifier and, optionally, keyword identifiers related to the content of the resource 105. The content item management system 120, in turn, provides targeted advertisements to the particular user device.

The publisher 104 and/or the content item management system 120 can also provide instructions that are served with the resource and/or advertisement, and with the landing page of the advertisement. These instructions cause the user device 106 to report various analytical data back to the content item management system 120. Such analytical data includes referring information, actions taken at the resource and at the landing page by the user of the user device, timestamps associated with each action, and other user interaction information.

The content item management system 120 includes a data storage system that stores content item data 122 and performance data 124. The content item data 122 stores content items, selection information, and other information for content item sponsors. For example, in the case of an advertising system, the content item data 122 can be campaign data storing advertisements, selection information, bidding information, budgeting information for advertisers. The performance data 124 stores data indicating the performance of the content items that are served. Such performance data can include, for example, click through rates for content items, the number of impressions for content items, and so on. Other performance data can also be stored.

The content items that are provided to user devices 106 are selected by a selection process implemented in a content item selection subsystem 126. In the case of advertisements, the content item selection subsystem 126 performs an auction, and content item data 122 and the performance data 124 are used as input parameters to the advertisement auction. In particular, the content item selection subsystem 126, in response to each request for advertisements, conducts an auction to select advertisements that are provided in response to the request. The auction receives as input, for each advertisement, a bid for the advertisement (such as a cost per click or cost per impression), selection information, and quality data. The selection information may, for example, include keywords, demographic data, and other selection information. The quality information may include quality metric values for a landing page associated with the advertisement, historical click through rates, and the like. These data are used to generate an auction score for each advertisement. The advertisements are ranked according to the scores in respective ordinal positions, and the advertisements with the highest auction scores are selected to respond to the advertisement request.

The display adjustment subsystem 130 receives the content item ranking data and the data of the advertisement request. Depending on the position of the viewport on the canvas of the resource, the display adjustment subsystem 130 may adjust ordinal positions for the content item slots so that a content item slot in the viewport corresponds to a highest adjusted ordinal position relative to the other content item slots.

Figure 2A:
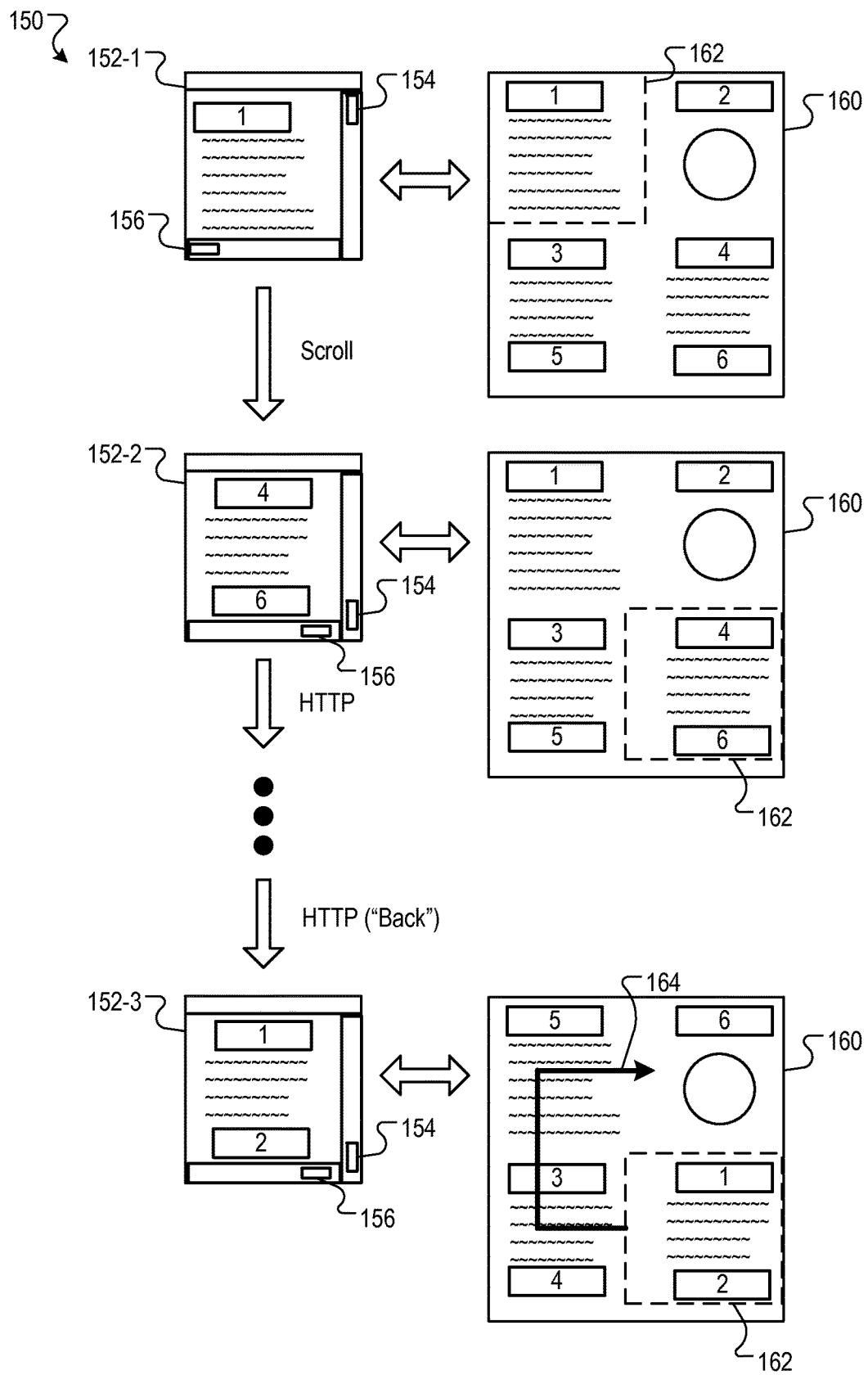
FIG. 2A is a process flow illustrating ordinal positioning of content items based on a viewport.
Figure 2B:
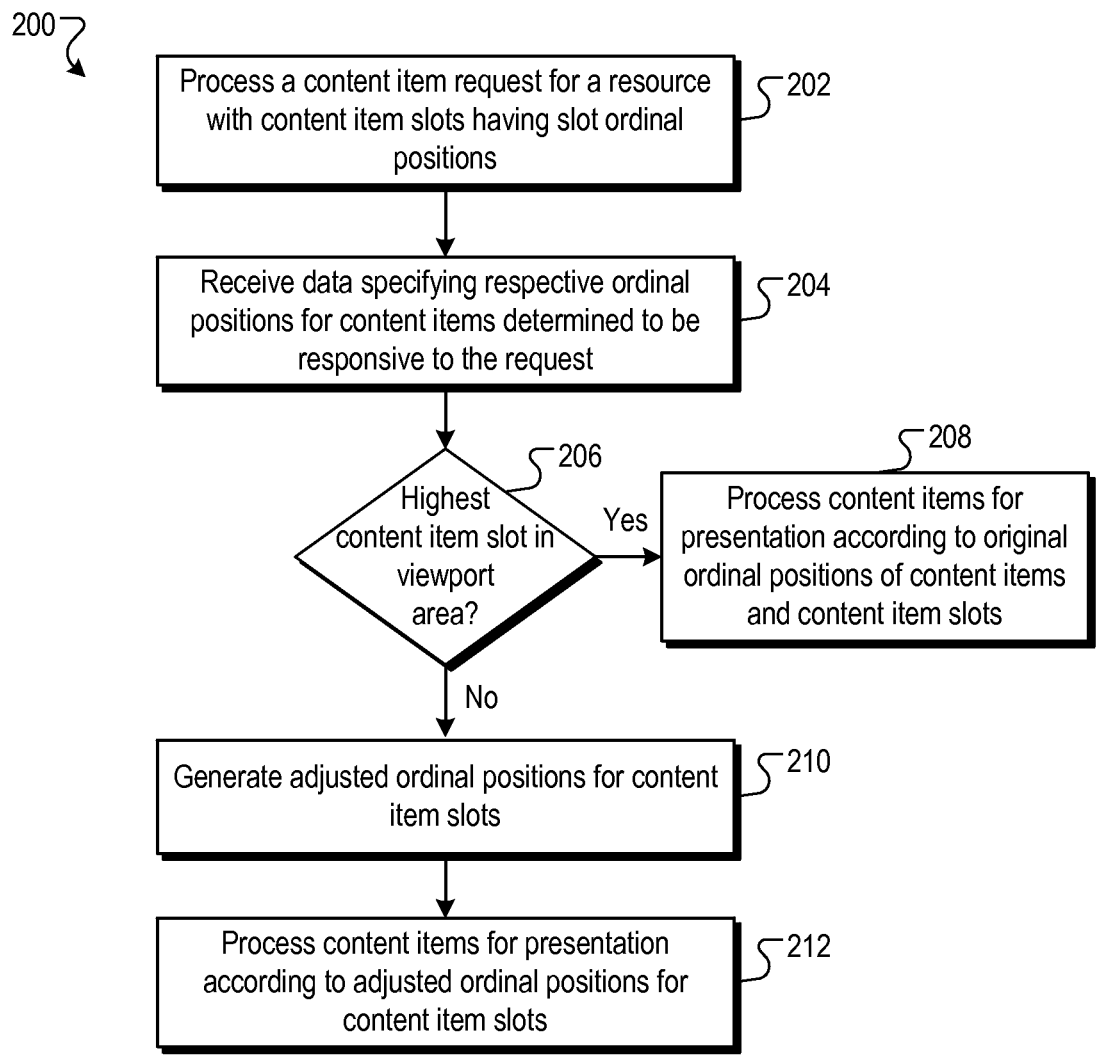
FIG. 2B is a flow diagram of an example process for adjusting the ordinal positioning of content items based on a viewport.

The generation of the adjusted ordinal positions is described with reference to FIGS. 2A and 2B. In particular, FIG. 2A is a process flow 150 illustrating ordinal positioning of content items based on a viewport, and FIG. 2B is a flow diagram of an example process 200 for adjusting the ordinal positioning of content items based on a viewport. The process 200 may be implemented in one or more computers in the display adjustment subsystem 130. While the process 200 is described as being implemented in the display adjustment subsystem 130, the process 200 can also be implemented locally in a user device 106 that includes instructions that cause the user device to perform the operations described below.

In FIG. 2A, a browser window 152-1 is shown as displaying a rendered resource 160 in a first state. The first state may be, for example, the result of rendering the resource for a first time during a user session. The rendered resource 160 defines a canvas that is larger than the viewport 162. In the first state, the viewport 162 is at a default location, e.g., such as the top left quadrant of the canvas, and as indicated by the vertical slider 154 and the horizontal slider 156. The rendered resource 160 includes content and content item slots, the latter which are respectively numbered by their corresponding ordinal position 1-6. The content item slot with the highest ordinal position (1) relative to the other content item slots is displayed in the viewport 162 when the page is rendered.

As shown, the resource 160 includes six content items (e.g., advertisements) rendered in the content item locations. The content items are provided by the content item server 120. In operation, the content item server 120 receives a content item request from the user device. The content item request includes viewport information specifying a viewport location and viewport area within the canvas 162 for the resource 160. The request may also include the ordinal positions of the slots, or, alternatively, the slot information for the resource 160 may be stored at the content item server 120.

The process 200 processes the content item request for the resource (202). For example, the content item management system 120 may submit the request to the selection subsystem 126 for an auction.

The process 200 receives data receive data specifying respective ordinal positions for content items determined to be responsive to the request (204). For example, the display adjustment subsystem receives data indicating the respective ordinal positions of the ranking of the content items resulting from the auction.

The process 200 determines whether the highest content item slot is in the viewport area (206). For example, the display adjustment subsystem 130 determines, for each content item slot, a respective display area and display location of the content item slot in the resource 160. The display adjustment subsystem 130 then determines whether the content item slot with the highest slot ordinal position is within the viewport area based on the respective display area and the respective display location of the content item slot with the highest ordinal position and the viewport location and viewport area. For example, data describing the document object model of the resource 160, or other resource information, may be accessed by the display adjustment subsystem 130, and from this data the display adjustment subsystem 130 may determine the location and area of the content item slots. The location and area of the content item slot with the highest ordinal position is compared to the location and area of the viewport.

For the first display state (browser window 152-1), the content item slot with the highest ordinal position is displayed in the view port 162. Accordingly, the process 200 processes content items for presentation according to original ordinal positions of content items and content item slots (208). The content items are provided according to their respective ordinal positions determined from the auction (positions 1-6) and rendered in the content item slots with corresponding ordinal positions (positions 1-6).

After the resource is rendered and the content items displayed, the user browses the resource. For example, the user may scroll down and right, as indicated by the vertical scroll bar 154 and horizontal scroll bar 156 as shown in browser window 152-2. Thus the browser displays the resource in a second state, as indicated by the browser window 152-2. In the second state, the viewport 162 is position in the lower right quadrant of the canvas of the rendered resource 160, and content item slots 4 and 6 are displayed in the viewport. Because the user device has not left the rendered resource 160, the content items corresponding to respective ordinal positions 4 and 6 are displayed.

Assume that the user navigates to another resource, as indicated by the HTTP request arrow. For example, the user may click on a link in the rendered resource 160. At a later time, the user decides to go back to the resource 160, and selects a "Back" command.

Provided the browser and the resource are configured to submit another HTTP request (or, alternatively submit another request for content items to the content item server), another set of content items will be provided for the resource. Process steps 204-206 will be repeated. However, with respect to 206, the process 200 will now determine that the content item slot with the highest ordinal position is not within the viewport area.

In response to this determination, the process 200 generates adjusted ordinal positions for the content item slots (208). The positions are adjusted so that a content item slot in the viewport corresponds to a highest adjusted ordinal position relative to the other content item slots. The process 200 then processes the content items for presentation according to adjusted ordinal positions for content item slots. For example, as shown in FIG. 2A, the browser window 152-3 in a third state has the two highest ordinal positioned content item locations (1 and 2) in the viewport 162.

The display adjustment subsystem 130 can use a variety of appropriate adjustment processes to generate adjusted ordinal position data. For example, one process that can be used is barrel shifting. In barrel shifting, the ordinal positions for the content item slots are shifted relative to the content item slot determined to be within the viewport area. The slots are re-ordered such that the slot above the slot with the adjusted first ordinal position is adjusted to last in the ordinal positions.

Table 1 below illustrates a barrel shift in which the content item slot originally in position 4 is now displayed in the viewport upon re-rendering the resource, and content item slots 1-3 are not displayed in the viewport.

TABLE 1

| Original | Adjusted |
|----------|----------|
| 1 | 4 |
| 2 | 5 |

TABLE 1-continued

| Original | Adjusted |
|----------|----------|
| 3 | 6 |
| 4 | 1 |
| 5 | 2 |
| 6 | 3 |

In another implementation, the display adjustment subsystem 130 can generate adjusted ordinal position data based on most likely viewport shift directions for the resource. For example, based on historical data, the display adjustment subsystem 130 may determine the direction (or directions) a user is most likely to move the viewport from a given viewport location. The adjusted ordinal position data can be arranged so that the content items are mostly likely to be seen by the viewer in descending order according to their respective auction rank. For example, with respect to FIG. 2A, arrow 164 indicates the most likely shift direction for the rendered resource 160. Accordingly, an ordinal adjustment as shown in FIG. 2A and in Table 2 is generated:

TABLE 2

| Original | Adjusted |
|----------|----------|
| 1 | 5 |
| 2 | 6 |
| 3 | 3 |
| 4 | 1 |
| 5 | 4 |
| 6 | 2 |

As described above, the adjusted ordinal positions can be generated by either adjusting the ordinal positions of the content item slots, or by adjusting the ordinal positions of the content items. These two processes are described with respect to FIGS. 3 and 4.

Figure 3:
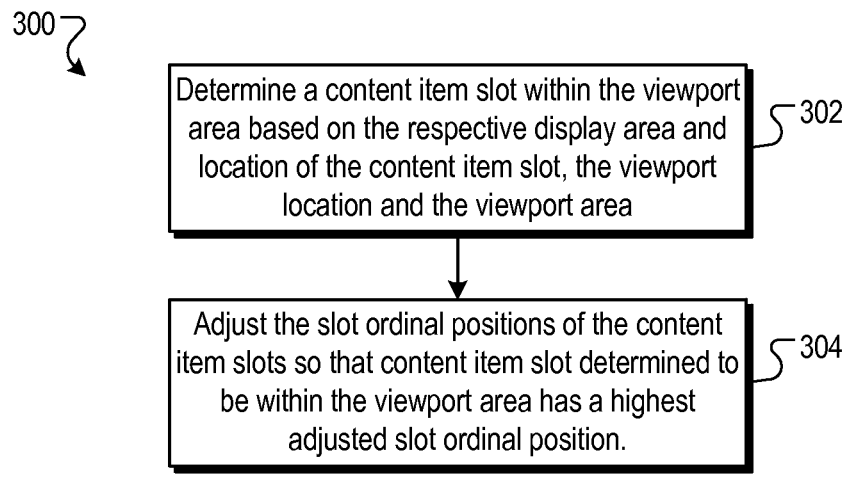
FIG. 3 if a flow diagram of an example process for adjusting the ordinal positions of content item slots.

FIG. 3 if a flow diagram of an example process 300 for adjusting the ordinal positions of content item slots. The process 300 may be implemented in one or more computers in the display adjustment subsystem 130.

The process 300 determines a content item slot within the viewport area based on the respective display area and location of the content item slot, the viewport location and the viewport area (302). For example, with respect to FIG. 2B, the process 300 determines that the content item slot corresponding to original ordinal position 4 is within the viewport 162 for browser window 152-3. This content item slot is selected so that it will display the highest ranked content item. In some implementations, when multiple content item slots are in the viewport, the process 300 can select the top most slot in the viewport. Other selection schemes can also be used to select a particular slot from among multiple slots when more than one content item slot is displayed in the viewport.

The process 300 adjusts the slot ordinal positions of the content item slots so that the content item slot determined to be within the viewport area has a highest adjusted slot ordinal position (304). For example, assume a barrel shift adjustment is used. The resulting adjusted ordinal position for each slot is depicted as in Table 3 below, and the content items will be rendered in the content item slots according to the adjusted ordinal positions of the slots.

TABLE 1

| Original Slot Position | Adjusted Slot Position |
|---|---|
| 1 | 4 |
| 2 | 5 |
| 3 | 6 |
| 4 | 1 |
| 5 | 2 |
| 6 | 3 |

Thus, the highest ranked content item will be displayed in original content item slot 4, which has been re-designated to ordinal position 1; the second-highest ranked content item will be displayed in original content item slot 5, which has been re-designated to ordinal position 2; and so on.

In summary, the ordinal positions the content item slots are adjusted so that the content item slot within the viewport corresponds to the first ordinal position. The content items are then rendered according to their own respective ordinal positions assigned during the auction, and which are not adjusted.

Figure 4:
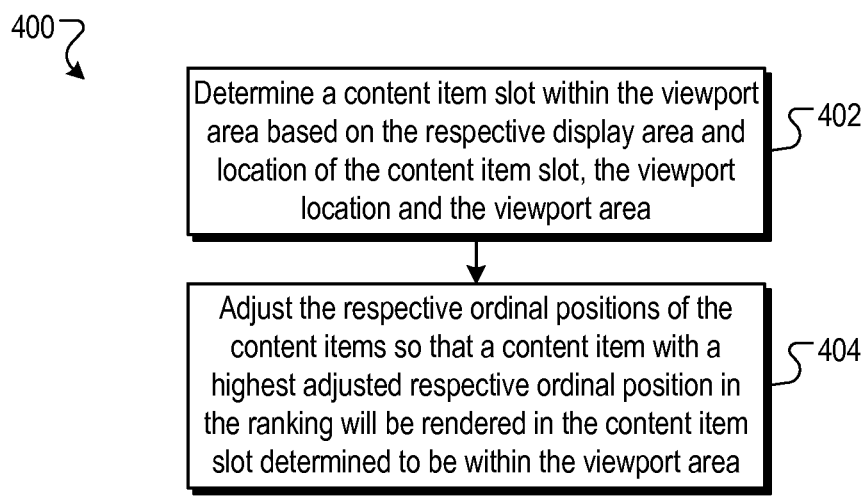
FIG. 4 is a flow diagram of an example process for adjusting the ordinal positions of content items.

FIG. 4 is a flow diagram of an example process 400 for adjusting the ordinal positions of content items. The process 400 may be implemented in one or more computers in the display adjustment subsystem 130. Like the process step 302, the first step 402 determines a content item slot within the viewport area based on the respective display area and location of the content item slot, the viewport location and the viewport area.

The process 400 then adjusts the respective ordinal positions of the content items so that a content item with a highest adjusted respective ordinal position in the ranking will be rendered in the content item slot determined to be within the viewport area (404). For example, for the browser window 152-3, the ranking of the content items would be adjusted as shown in Table 4 below for a barrel shift.

TABLE 4

| Original Content Item Ranking | Adjusted Content Item Ranking |
|---|---|
| 1 | 4 |
| 2 | 5 |
| 3 | 6 |
| 4 | 1 |
| 5 | 2 |
| 6 | 3 |

Thus, the highest ranked content item will be displayed in original content item slot 4, as the highest ranked content item is now designated for the purposes of rendering as the fourth ranked content item; the second-highest ranked content item will be displayed in original content item slot 5, as the second-highest ranked content item is now designated for the purposes of rendering as the fifth ranked content item; and so on.

In summary, the respective ordinal positions the content items are adjusted so that the content item slot within the viewport corresponds to the content item that is ranked first in the ranking. The content items are then rendered according to the adjusted ordinal positions in the corresponding ordinal positions of the content item slots, which are not adjusted.

In both adjustment schemes the actual charges incurred for auctions are not changed. In particular, even though the highest ranked content item is being shown in a location that, without adjustment, would be reserved for a lower ranked content item, the incurred auction cost is still commensurate with a first place ranking. This is because in both browser states shown in 152-1 and 152-3, the utility and value to the first place winner of the auction is the same, even though the corresponding top-ranked content items are shown in different locations.

While the processes 200, 300 and 400 have been described in the context of a content item serving system, the processes can also be implemented on user devices. In such implementations, the decision to adjust ordinal positions of either the content item slots or the content items that are received is implemented in, for example, a browser plug-in or script. The processing of the content item request for a resource is thus the generating, at a user device, the content item request and transmitting the content item request to a content item server. Likewise, the device determines the position data position data defining the adjusted ordinal positions for the content item slots and the content items for presentation in the content item slots, and renders the content items in the content items slots according to the position data.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output/Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Figure 5:
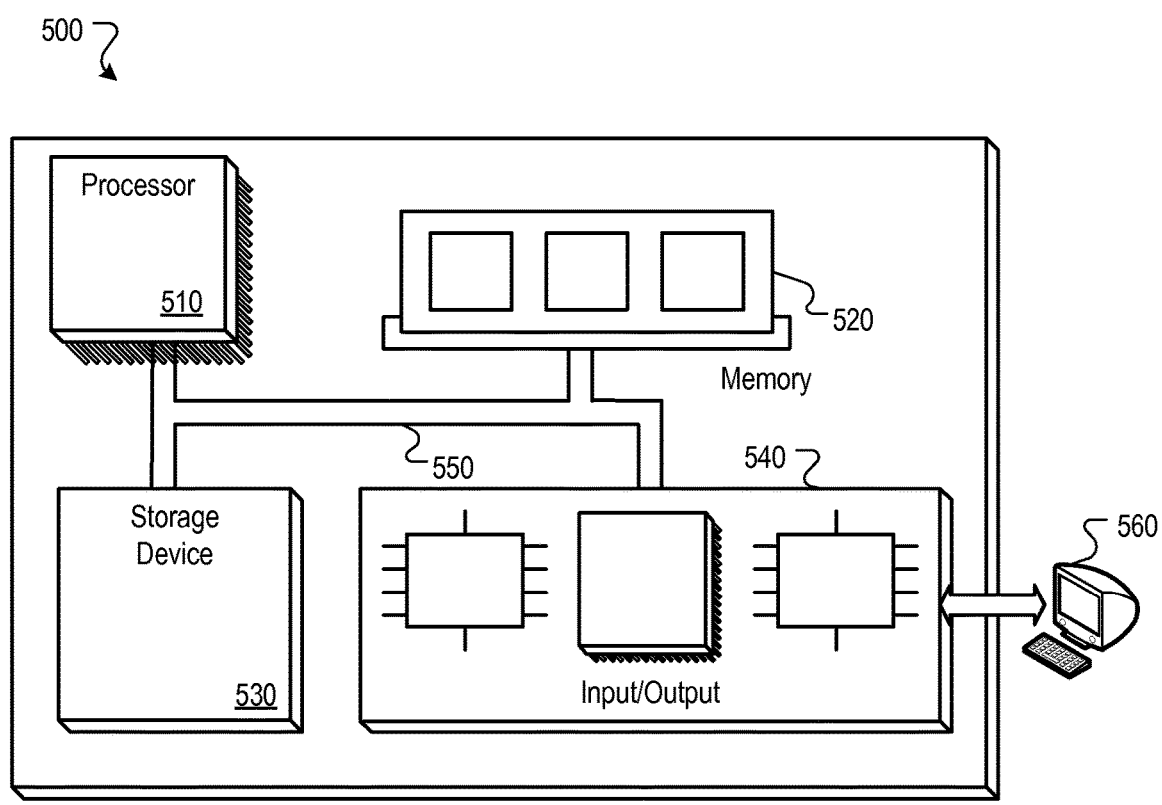
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 620, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
   processing a content item request for a resource, the content item request including viewport information specifying an initial state of the resource as defined by a viewport location and viewport area within a canvas for the resource, and wherein the resource includes a plurality of content item slots that each define a location in the resource at which a content item responsive to the request is to be rendered, and each content item slot has a slot ordinal position relative to other content item slots in the resource that corresponds to respective ordinal position of a content item in a ranking for content items served in response to the request when the resource is presented according to the initial state;
   receiving, by a data processing apparatus, data specifying respective ordinal positions for content items in a ranking of content items determined to be responsive to the request, the respective ordinal positions causing the content item with the highest respective ordinal position in the ranking to be rendered in the content item slot with a highest ordinal position relative to the other content item slots;
   presenting content items in the content item slots that are displayed in the initial state of the resource;
   after presenting content items in the content item slots that are displayed in the initial state of the resource, receiving a request for content generated by a user selecting a back command after the user transitioned a display of the resource from the initial state to a second state and subsequently navigated away from the resource, wherein the second state of the resource presents different content item slots than the initial state of the resource, and wherein the resource is presented according to the second state when re-rendered in response to the back command;
   determining, by the data processing apparatus, that the display of the resource in the second state omits a first content item slot with a highest slot ordinal position relative to the other content item slots when the resource is displayed according to the initial state, and that a second content item slot with a lower slot ordinal position than the slot ordinal position of the first content item slot is within the viewport area when the resource is displayed according to the second state, and in response, generating adjusted ordinal positions for the content item slots in the second state, including reassigning the second content item slot to the highest slot ordinal position of the first content item slot, thereby causing the content item with the highest ordinal position to be rendered in the second content item slot and within the viewport area while the resource is displayed according to the second state;
   determining, by the data processing apparatus and based on a current viewport location corresponding to the second state and historical data, a set of directions that the user is most likely to move the viewport from the current viewport location;
   reassigning, based on the determined set of directions that the user is most likely to move the viewport, the ordinal positions of the content item slots that are not visible in the second state so that content item slots that have a higher likelihood of being moved to next have a higher ordinal position than other not currently visible content item slots; and
   processing, by the data processing apparatus, in response to the content item request, position data defining the adjusted ordinal positions for the content item slots and the content items for presentation in the content item slots.

2. The computer-implemented method of claim 1, wherein:
   processing a content item request for a resource comprises receiving at a content item server the content item request, wherein the content item request has been transmitted from a user device; and
   processing the position data defining the adjusted ordinal positions for the content item slots and the content items for presentation in the content item slots comprises providing, from the content item server, the content items and the position data to the user device.

3. The computer-implemented method of claim 2, wherein:
   determining, from the viewport information, that the first content item slot with the highest slot ordinal position relative to the other content item slots is not with the viewport comprises:
   determining, for each content item slot, a respective display area and display location of the content item slot in the resource; and
   determining that the first content item slot with the highest slot ordinal position is not within the viewport area based on the respective display area, the respective display location, the viewport location and the viewport area.

4. The computer-implemented method of claim 3, wherein generating adjusted ordinal positions for the content item slots comprises:
determining the second content item slot within the viewport area based on the respective display area of the content item slot, the respective location of the content item slot, the viewport location and the viewport area.

5. The computer-implemented method of claim 4, wherein generating adjusted ordinal positions for the content item slots comprises barrel shifting the slot ordinal positions of the content item slots relative to the second content item slot determined to be within the viewport area.

6. The computer-implemented method of claim 3, wherein generating adjusted ordinal positions for the content item slots comprises:
determining the second content item slot within the viewport area based on the respective display area of the content item slot, the viewport location and the viewport area; and
adjusting the respective ordinal positions of the content items so that a content item with a highest adjusted respective ordinal position in the ranking will be rendered in the second content item slot determined to be within the viewport area.

7. The computer-implemented method of claim 6, wherein adjusting the respective ordinal positions of the content items comprises barrel shifting the respective ordinal positions of the content item relative to the content item to be rendered in the second content item slot determined to be within the viewport area.

8. The computer-implemented method of claim 1, wherein:
processing a content item request for a resource comprises generating, at a user device, the content item request and transmitting the content item request to a content item server; and
processing the position data defining the adjusted ordinal positions for the content item slots and the content items for presentation in the content item slots comprises generating the position data at the user device and rendering the content items in the content items slots according to the position data.

9. The computer implemented method of claim 8, wherein:
determining that the display of the resource in the second state omits the first content item slot with the highest slot ordinal position relative to the other content item slots when the resource is displayed according to the initial state comprises:
determining, for each content item slot, a respective display area and display location of the content item slot in the resource; and
determining that the display of the resource in the second state omits the first content item slot with the highest slot ordinal position based on the respective display area, the respective display location, the viewport location and the viewport area.

10. The computer-implemented method of claim 9, wherein generating adjusted ordinal positions for the content item slots in response to determining that the display of the resource in the second state omits the first content item slot with the highest slot ordinal position relative to the other content item slots when the resource is displayed according to the initial state comprises:
determining the second content item slot within the viewport area based on the respective display area of the content item slot, the respective location of the content item slot, the viewport location and the viewport area; and
adjusting the slot ordinal positions of the content item slots so that the second content item slot determined to be within the viewport area has the highest slot ordinal position.

11. The computer-implemented method of claim 9, wherein generating adjusted ordinal positions for the content item slots comprises:
determining the second content item slot within the viewport area based on the respective display area of the content item slot, the respective location of the content item slot, the viewport location and the viewport area; and
adjusting the respective ordinal positions of the content items so that a content item with a highest adjusted respective ordinal position in the ranking will be rendered in the second content item slot determined to be within the viewport area.

12. A system comprising:
a data processing apparatus; and
a computer storage medium encoded with a computer program, the program comprising instructions that when executed by the data processing apparatus cause the data processing apparatus to perform operations comprising:
processing a content item request for a resource, the content item request including viewport information specifying an initial state of the resource as defined by a viewport location and viewport area within a canvas for the resource, and wherein the resource includes a plurality of content item slots that each define a location in the resource at which a content item responsive to the request is to be rendered, and each content item slot has a slot ordinal position relative to other content item slots in the resource that corresponds to respective ordinal position of a content item in a ranking for content items served in response to the request when the resource is presented according to the initial state;
receiving, by a data processing apparatus, data specifying respective ordinal positions for content items in a ranking of content items determined to be responsive to the request, the respective ordinal positions causing the content item with the highest respective ordinal position in the ranking to be rendered in the content item slot with a highest ordinal position relative to the other content item slots;
presenting content items in the content item slots that are displayed in the initial state of the resource;
after presenting content items in the content item slots that are displayed in the initial state of the resource, receiving a request for content generated by a user selecting a back command after the user transitioned a display of the resource from the initial state to a second state and subsequently navigated away from the resource, wherein the second state of the resource presents different content item slots than the initial state of the resource, and wherein the resource is presented according to the second state when re-rendered in response to the back command;
determining, by the data processing apparatus, that the display of the resource in the second state omits a first content item slot with a highest slot ordinal position relative to the other content item slots when the resource is displayed according to the initial state, and that a second content item slot with a lower slot ordinal position than the slot ordinal position of the first content item slot is within the viewport area when the resource is displayed according to the second state, and in response, generating adjusted ordinal positions for the content item slots in the second state, including reassigning the second content item slot to the highest slot ordinal position of the first content item slot, thereby causing the content item with the highest ordinal position to be rendered in the second content item slot and within the viewport area while the resource is displayed according to the second state;

determining, by the data processing apparatus and based on a current viewport location corresponding to the second state and historical data, a set of directions that the user is most likely to move the viewport from the current viewport location;

reassigning, based on the determined set of directions that the user is most likely to move the viewport, the ordinal positions of the content item slots that are not visible in the second state so that content item slots that have a higher likelihood of being moved to next have a higher ordinal position than other not currently visible content item slots; and processing, by the data processing apparatus, in response to the content item request, position data defining the adjusted ordinal positions for the content item slots and the content items for presentation in the content item slots.

13. The system of claim 12, wherein:
processing a content item request for a resource comprises receiving at a content item server the content item request, wherein the content item request has been transmitted from a user device; and
processing the position data defining the adjusted ordinal positions for the content item slots and the content items for presentation in the content item slots comprises providing, from the content item server, the content items and the position data to the user device.

14. The system of claim 13, wherein:
determining that the display of the resource in the second state omits the first content item slot with the highest slot ordinal position relative to the other content item slots when the resource is displayed according to the initial state comprises:
determining, for each content item slot, a respective display area and display location of the content item slot in the resource; and
determining that the first content item slot with the highest slot ordinal position is not within the viewport area based on the respective display area, the respective display location, the viewport location and the viewport area.

15. The system of claim 14, wherein generating adjusted ordinal positions for the content item slots comprises:
determining the second content item slot within the viewport area based on the respective display area of the content item slot, the respective location of the content item slot, the viewport location and the viewport area.

16. The system of claim 14, wherein generating adjusted ordinal positions for the content item slots comprises:
determining the second content item slot within the viewport area based on the respective display area of the content item slot, the viewport location and the viewport area; and
adjusting the respective ordinal positions of the content items so that a content item with a highest adjusted respective ordinal position in the ranking will be rendered in the second content item slot determined to be within the viewport area.

17. A computer storage medium encoded with a computer program, the program comprising instructions that when executed by data processing apparatus cause the data processing apparatus to perform operations comprising:
processing a content item request for a resource, the content item request including viewport information specifying an initial state of the resource as defined by a viewport location and viewport area within a canvas for the resource, and wherein the resource includes a plurality of content item slots that each define a location in the resource at which a content item responsive to the request is to be rendered, and each content item slot has a slot ordinal position relative to other content item slots in the resource that corresponds to respective ordinal position of a content item in a ranking for content items served in response to the request when the resource is presented according to the initial state;
receiving, by a data processing apparatus, data specifying respective ordinal positions for content items in a ranking of content items determined to be responsive to the request, the respective ordinal positions causing the content item with the highest respective ordinal position in the ranking to be rendered in the content item slot with a highest ordinal position relative to the other content item slots;
presenting content items in the content item slots that are displayed in the initial state of the resource;
after presenting content items in the content item slots that are displayed in the initial state of the resource, receiving a request for content generated by a user selecting a back command after the user transitioned a display of the resource from the initial state to a second state and subsequently navigated away from the resource, wherein the second state of the resource presents different content item slots than the initial state of the resource, and wherein the resource is presented according to the second state when re-rendered in response to the back command;
determining, by the data processing apparatus, that the display of the resource in the second state omits a first content item slot with a highest slot ordinal position relative to the other content item slots when the resource is displayed according to the initial state, and that a second content item slot with a lower slot ordinal position than the slot ordinal position of the first content item slot is within the viewport area when the resource is displayed according to the second state, and in response, generating adjusted ordinal positions for the content item slots in the second state, including reassigning the second content item slot to the highest slot ordinal position of the first content item slot, thereby causing the content item with the highest ordinal position to be rendered in the second content item slot and within the viewport area while the resource is displayed according to the second state;
determining, by the data processing apparatus and based on a current viewport location corresponding to the second state and historical data, a set of directions that the user is most likely to move the viewport from the current viewport location;
reassigning, based on the determined set of directions that the user is most likely to move the viewport, the ordinal positions of the content item slots that are not visible in the second state so that content item slots that have a higher likelihood of being moved to next have a higher ordinal position than other not currently visible content item slots; and processing, by the data processing apparatus, in response to the content item request, position data defining the adjusted ordinal positions for the content item slots and the content items for presentation in the content item slots.

18. The computer storage medium of claim 17, wherein:
processing a content item request for a resource comprises receiving at a content item server the content item request, wherein the content item request has been transmitted from a user device; and processing the position data defining the adjusted ordinal positions for the content item slots and the content items for presentation in the content item slots comprises providing, from the content item server, the content items and the position data to the user device.

19. The computer storage medium of claim 18, wherein:
determining that display of the resource in the second state omits the first content item slot with the highest slot ordinal position relative to the other content item slots when the resource is displayed according to the initial state comprises:

determining, for each content item slot, a respective display area and display location of the content item slot in the resource; and determining that the display of the resource in the second state omits the first content item slot with the highest slot ordinal position when the resource is displayed according to the initial state based on the respective display area, the respective display location, the viewport location and the viewport area.

20. The computer storage medium of claim 19, wherein generating adjusted ordinal positions for the content item slots comprises:

determining the second content item slot within the viewport area based on the respective display area of the content item slot, the respective location of the content item slot, the viewport location and the viewport area.

21. The computer storage medium of claim 19, wherein generating adjusted ordinal positions for the content item slots comprises:

determining the second content item slot within the viewport area based on the respective display area of the content item slot, the viewport location and the viewport area; and adjusting the respective ordinal positions of the content items so that a content item with a highest adjusted respective ordinal position in the ranking will be rendered in the second content item slot determined to be within the viewport area.

* * * * *